US 10,196,108 B2

(12) United States Patent
Spröte et al.

(10) Patent No.: US 10,196,108 B2
(45) Date of Patent: Feb. 5, 2019

(54) TRANSMISSION

(71) Applicant: MÖVE BIKES GMBH, Mühlhausen (DE)

(72) Inventors: Tobias Spröte, Mühlhausen (DE); Dominik Burre, Mühlhausen (DE); Marcus Rochlitzer, Mühlhausen (DE); Julius Legenmajer, Jena (DE)

(73) Assignee: MÖVE BIKES GMBH, Mülhausen (DE)

( * ) Notice: Subject to any disclaimer, the term of this patent is extended or adjusted under 35 U.S.C. 154(b) by 60 days.

(21) Appl. No.: 15/535,161

(22) PCT Filed: Dec. 9, 2015

(86) PCT No.: PCT/EP2015/025098
§ 371 (c)(1),
(2) Date: Jun. 12, 2017

(87) PCT Pub. No.: WO2016/096153
PCT Pub. Date: Jun. 23, 2016

(65) Prior Publication Data
US 2017/0320538 A1    Nov. 9, 2017

(30) Foreign Application Priority Data
Dec. 12, 2014 (DE) .................. 10 2014 018 267

(51) Int. Cl.
B62M 3/06         (2006.01)
B62M 11/14        (2006.01)
(Continued)

(52) U.S. Cl.
CPC .............. B62M 3/06 (2013.01); B62M 11/02 (2013.01); B62M 11/145 (2013.01); F16H 1/28 (2013.01)

(58) Field of Classification Search
None
See application file for complete search history.

(56) References Cited

U.S. PATENT DOCUMENTS

| 512,479 A * | 1/1894 | McKenzie et al. .... B62M 11/14 475/314 |
| 4,159,652 A * | 7/1979 | Trammell, Jr. .......... B62M 1/26 280/259 |

(Continued)

FOREIGN PATENT DOCUMENTS

| DE | 10 2010 033 211 B4 | 7/2013 |
| FR | 945484 A * | 5/1949 ............ B62M 11/00 |

Primary Examiner — Dirk Wright
(74) Attorney, Agent, or Firm — Hudak, Shunk & Farine Co. LPA

(57) ABSTRACT

A transmission for a system, in which a directed force is introduced eccentrically with respect to a main shaft of the transmission, comprising the main shaft which is rotatably mounted in relation to a stationary housing by a main shaft bearing, a sun gear which is fixedly connected to the housing being arranged concentrically around the main shaft, and at least one control housing that rotates around the housing, wherein the first section thereof acts on the main shaft in a rotationally fixed manner and a planetary wheel is rotatably mounted by a first rotary bearing on the second section thereof, said planetary gear meshing with the sun gear. According to the invention, a force transmission means is fastened to the control housing and a drive crank rigidly engages the first end on the planetary wheel, wherein a second end of the drive crank is mounted in an articulated manner on a crank arm, said crank arm being supported in relation to the control housing by a movable coupling means. The aim of the invention was to provide a transmission having structural dimensions which are as compact as possible in the axial direction of the main shaft. Said aim is achieved in that the movable coupling means is a linear (Continued)

guide which absorbs tilting torques transmitted by the crank arm.

18 Claims, 5 Drawing Sheets

(51) Int. Cl.
*B62M 11/02* (2006.01)
*F16H 1/28* (2006.01)

(56) References Cited

U.S. PATENT DOCUMENTS

| | | | |
|---|---|---|---|
| 4,281,845 A * | 8/1981 | Brown | B62M 3/06 |
| | | | 280/236 |
| 4,309,043 A | 1/1982 | Brown | |
| 5,515,746 A * | 5/1996 | Yamaguchi | B62M 1/36 |
| | | | 74/594.1 |
| 6,840,136 B1 * | 1/2005 | Jones | B62M 1/36 |
| | | | 280/259 |
| 2007/0234846 A1 | 10/2007 | Sun | |

* cited by examiner

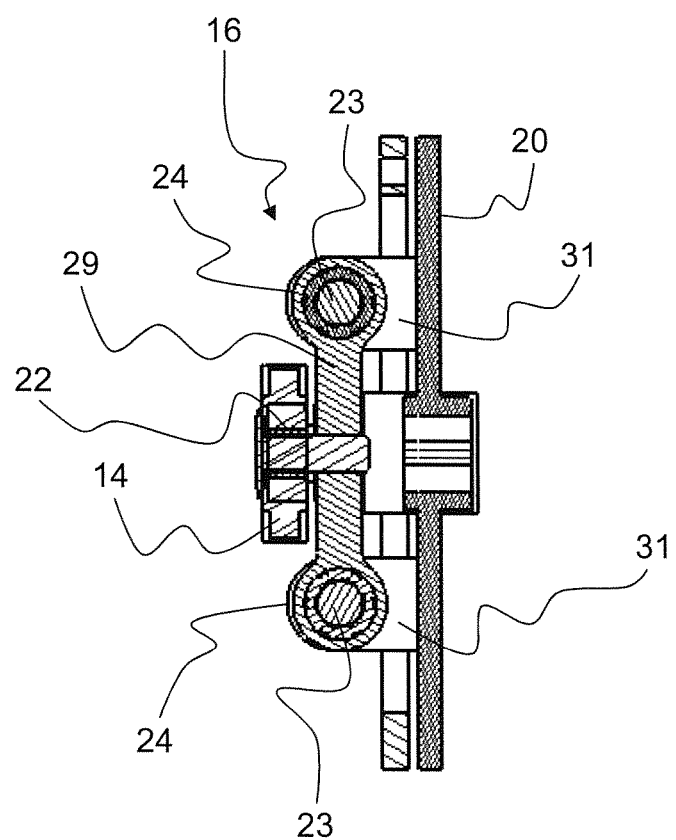

TRANSMISSION

FIELD OF THE INVENTION

The invention concerns a transmission in which a directed force is introduced eccentrically to a main shaft of the transmission.

BACKGROUND OF THE INVENTION

Such transmissions may be built in particular in bicycles and ensure an amplification of the torque through the force applied by the bicycle rider. In this application, the housing of the transmission is adapted to a frame component and the force transmission means, such as a toothed ring, transmits the torque generated by the bicycle rider via a chain to the rear wheel. However, the transmission according to the invention may likewise be provided, for example, for wind power plants with vertically placed axles of rotation.

A prior art of this kind is formed by DE 10 2010 033 211 B4 with a bicycle transmission, in which the sun wheel, the planet gear and the crank are arranged inside a common crank housing and the crank arm is braced by means of a guide roller against a guide rail likewise arranged in the crank housing. The crank engages on two sides with a head of the crank arm and thereby takes up any tilting moments present. The guide roller, on the other hand, runs freely against the guide rail, or else the mounting of the crank arm head would be over constrained. It has proven to be a drawback in the known transmission that the pedaling is felt as being spongy on account of the free running guide roller and furthermore the known design with a crank arm head mounted on two sides results in a large Q-factor. The Q-factor in a bicycle designates the lateral distance of the outer surfaces of the two pedal cranks from each other. The larger the Q-factor, the further apart are the pedals. This increases the risk on tight curves taken at high speed that the inside pedal will touch down, and too large a Q-factor is harmful for ergonomic reasons. Also in other fields of technology it is desirable to realize a transmission of the most compact possible design in the axial direction of the main shaft.

SUMMARY OF THE INVENTION

Consequently, the problem which the invention proposes to solve is to provide a transmission having the most compact possible dimension in the axial direction of the main shaft.

The problem is solved according to the invention with the characterizing features of a transmission for a system, in which a directed force is introduced eccentrically to a main shaft of the transmission, comprising the main shaft, which is mounted pivotably with respect to a stationary housing by a main shaft bearing, wherein a sun wheel firmly connected to the housing is arranged concentrically about the main shaft, and at least one control housing rotating about the housing, whose first section engages with the main shaft in a rotationally fixed manner and on whose second section there is rotationally mounted a planet gear by a first rotary bearing, which meshes with the sun wheel, while on the control housing there is fastened a force transmission means and a crank rigidly engages the planet gear by its first end, while a second end of the crank is pivotally hinged to a crank arm and the crank arm is braced by a movable coupling means relative to the control housing, wherein the movable coupling means is a linear guide, which takes up the tilting moments transmitted by the crank arm.

By a linear guide is meant a machine element enabling the most friction-free translation of one or more movable assemblies of a machine and at the same time guaranteeing the holding of a direction of movement—a linear trajectory. The linear guide according to the invention must also take up the tilting moments which are present. The components involved in the torque transmission, such as the crank arm and crank, do not change their position in this process, but rather only swivel relative to each other. The bearing axles of all rotary mounted components are oriented parallel to each other.

Advantageously, the control housing has a wall segment whose inner side faces the sun wheel and the planet gear and whose outer side faces the crank. The wall segment is configured as a substantially flat plate, with the outer side opposite the inner side. Thanks to the wall segment, the sun wheel and planet gear are separated from the crank. In this way, they are especially favorably protected against external influences, while in addition an encapsulation of the sun wheel and planet gear may engage with the wall segment. The wall segment also carries the planet gear, which runs entirely through the wall segment in the axial direction.

According to another preferred embodiment, the crank arm is mounted on the crank by means of a second rotary bearing and lies against the crank at one end. This design favors the desired compact dimensions of the transmission, since the crank may be mounted on the crank arm at one end and no forklike bracket has to be present for the mounting of the crank arm at both ends.

Advisedly, the linear guide is arranged on the outer side of the wall segment. Thus, the linear guide turns together with the control housing and is always situated in the same position relative to the force transmission means. The mounting of the linear guide on the outer side of the wall segment additionally contributes to the narrowest possible design of the transmission in the axial direction of the main shaft.

The force transmission means may be at least one toothed ring. In the case of a derailleur of a bicycle, several toothed rings with different diameters may also be offset from one another in the axial direction. In place of a toothed ring, belt pulleys etc. may also be used.

Advantageously, the linear guide comprises at least one guide rail with a carriage guided thereon. By a guide rail is meant linear support and guide elements which are arranged singly or in pairs and parallel to each other. The carriage during operation is inseparably connected to the at least one guide rail and is guided thereon.

It has proven to be especially advantageous for the at least one guide rail and/or the carriage to overlap at least partly the toothed ring in its axial direction or to be arranged behind the toothed ring in the direction of the sun wheel. Accordingly, the guide rail and/or the carriage engage in the axial direction with the at least one toothed ring, which further reduces the dimension of the transmission in the axial direction of the main shaft.

Alternatively or additionally to the above embodiment, the at least one guide rail may be arranged so that a section of the carriage crosses a center axis of the main shaft twice during one revolution of the crank arm. The carriage or at least a portion of the carriage therefore executes an alternating movement about the center axis, which is situated in a prolongation of the main shaft. The available travel of the carriage on the guide rail is thus shifted into a central region of the toothed ring. This embodiment also contributes to moving the guide rail in the axial direction into the toothed ring.

According to a first embodiment, the rail element comprises a guide rail and the carriage element a carriage, while the carriage is movable on the guide rail with one degree of freedom. By degree of freedom is meant the number of movement possibilities of a system which are independent of each other and accordingly freely selectable. A rigid body can move in space in three mutually independent directions (translation) and turn in three mutually independent planes (rotation). The carriage in this embodiment can only follow the course of the guide rail.

According to a second embodiment, the rail element comprises two guide rails and the carriage element one carriage, while the carriage is movable on the guide rails with one degree of freedom. By the use of two parallel guide rails the risk of a jamming or skewing is significantly reduced.

Preferably the carriage is arranged between the guide rails and bears against them by two roller pair each, the roller pairs each having two rollers whose cross section profile is designed complementary to the cross section profile of the corresponding guide rail. Typically, the rollers are formed with a convex or concave cross section profile. Thanks to the arrangement of two aligned rollers each time, any tilting moment of the carriage is especially effectively taken up.

In the two embodiments discussed above, a third rotary bearing advantageously engages directly with the carriage and the crank arm. Thanks to a rotary movement of the end of the crank arm hinged to the crank, the angle position of the entire crank arm to the carriage also changes permanently during operation. With the help of the third rotary bearing, the carriage is decoupled from the changes in angle position of the crank arm.

According to a third alternative embodiment, two guide rails and two carriages are provided, one carriage being fastened to each guide rail.

Each carriage may be movable on the respective guide rail with one degree of freedom. This means that each of the carriages is led on its corresponding guide rail in rotationally fixed manner. This is accomplished for example in that the guide rail and the carriage have a complementary shaped polygon profile. With a polygon profile, an especially jam-free running can be achieved.

Each of the carriages can be movable on the corresponding guide rail with two degrees of freedom. In this case, the carriages should be rotatably guided on their respective guide rail in the circumferential direction, that is, the carriages sit on a cylindrical guide.

Insofar as two carriages are used on a corresponding guide rail, the carriages may be joined together by means of a tie bar and the third rotary bearing can be arranged between the tie bar and the crank arm. Thanks to a firm connection of the carriages by means of the tie bar, the carriages are braced against each other and block against a twisting about the respective guide rail.

Preferably, the carriage(s) are designed as a circulating ball element of a linear guide or a sliding bearing element. The circulating ball elements of a linear guide are ball bearings with an axial race for the ball. The purpose of this circulating ball element of a linear guide is not the mounting of a rotating element, as in the case of all other rotary bearings, but instead the most friction-free guidance of the translatory, i.e., straight-line movement of a machine element along the guide rail. The circulating ball elements of a linear guide have less friction losses than a comparably loaded sliding bearing.

Especially in the case of a transmission mounted on a bicycle it is advisable for two control housings to engage with the main shaft, being arranged with a 180° offset in the circumferential direction.

BRIEF DESCRIPTION OF THE DRAWINGS

For a better understanding, the invention shall now be explained more closely by means of seven figures. These show:

FIG. 7: a cross section through the linear guide along the sectioning plane A-A in FIG. 6.

DETAILED DESCRIPTION OF THE INVENTION

Figure 1:
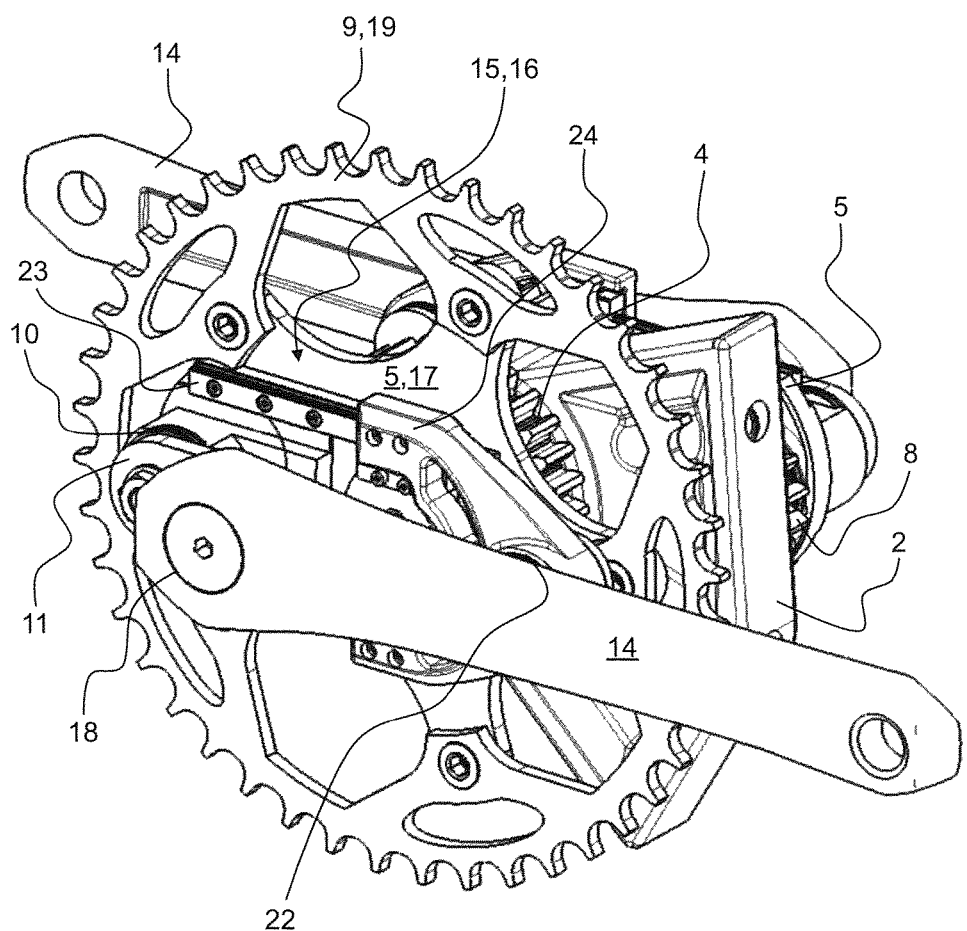
FIG. 1: a perspective view of a transmission with two control housings.

FIG. 1 shows a perspective view of the transmission according to the invention, which may be secured via a housing 2 to a frame or beam, not shown. The transmission is built as a mirror image on either side of the housing 2, with the sole difference that a force transmission means 9 in the form of a toothed ring 19 is present in the section situated in front in the plane of the drawing, which is mounted on a control housing 5 in a rotationally fixed manner. On the toothed ring 19 there may be placed, for example, a chain (not shown), which in turn transmits a rotary movement of the control housing 5 and thus also of the toothed ring 19.

Figure 2:
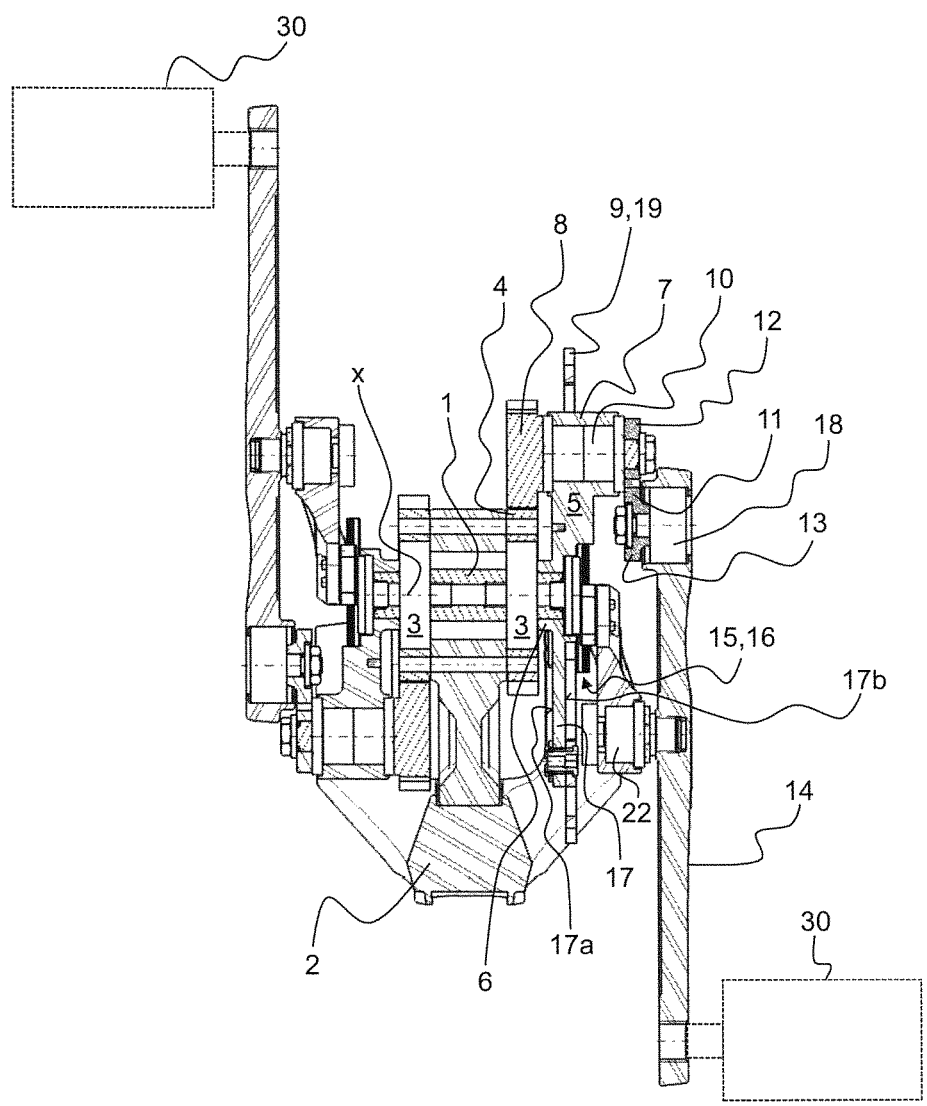
FIG. 2: a cross section through the transmission.

Through the housing 2 there runs a main shaft 1, visible in the cross section in FIG. 2, being mounted in rotational manner with respect to the housing 2 by two main shaft bearings 3 at a spacing from each other in the axial direction. The main shaft 1 is firmly connected at both ends to a control housing 5.

Furthermore, on opposite sides of the housing 2 there is secured one sun wheel 4 each. The two sun wheels 4 pass coaxially about the main shaft 1.

The control housing 5 is firmly connected by its first section 6 to the main shaft 1 and rotates upon activation of one or both crank arms 14 about a center axis x of the main shaft 1. At a second section 7 of the control housing 5 situated opposite the first section 6 there is mounted a planet gear 8 in rotational manner by means of a first rotary bearing 10, which is in constant operative engagement with the sun wheel 4 and runs against the crank arm 14 when it is moved. The planet gear 8 in its axial extension passes entirely through the second section 7 of the control housing 5. At the side of the planet gear 8 facing away from the housing 2, a first end 12 of a crank 11 is rigidly secured, so that the crank 11 rotates together with the planet gear 8 about a common axis. The crank arm 14 carries along the crank 11 by means of a rotary bearing 18 arranged thereon at a second end 13.

The crank arm 14 is mounted solely on the side facing the control housing 5.

Furthermore, the crank arm 14 is braced in pivoting manner by means of a third rotary bearing 22 against a coupling means 15 in the form of a linear guide 16. The linear guide 16 is arranged centrally within the toothed ring 19 and enables a linear movement of the crank arm 14 by an amount corresponding to twice the radius of the crank 11.

The control housing 5 comprises at least one wall segment 17 substantially perpendicular to the center axis x, whose inner side 17a is directed toward the sun wheel 4 as well as the planet gear 8. The opposite outer side 17b of the wall segment 17 is arranged near the crank 11 and the crank arm 14. Furthermore, the wall segment 17 carries on its outer side 17b the linear guide 16, which regardless of its specific embodiment comprises at least one guide rail 23. The at least one guide rail 23 is secured in stationary manner to the outer side 17b of the wall segment 17 of the control housing 5, especially by a screw or rivet connection.

At the ends of the two crank arms 14 are arranged pedals 30, for example in FIG. 2, each of which point away from the transmission.

In FIGS. 3 to 7 different embodiments of linear guides 16 arranged in the transmission according to the invention are explained.

Figure 3:
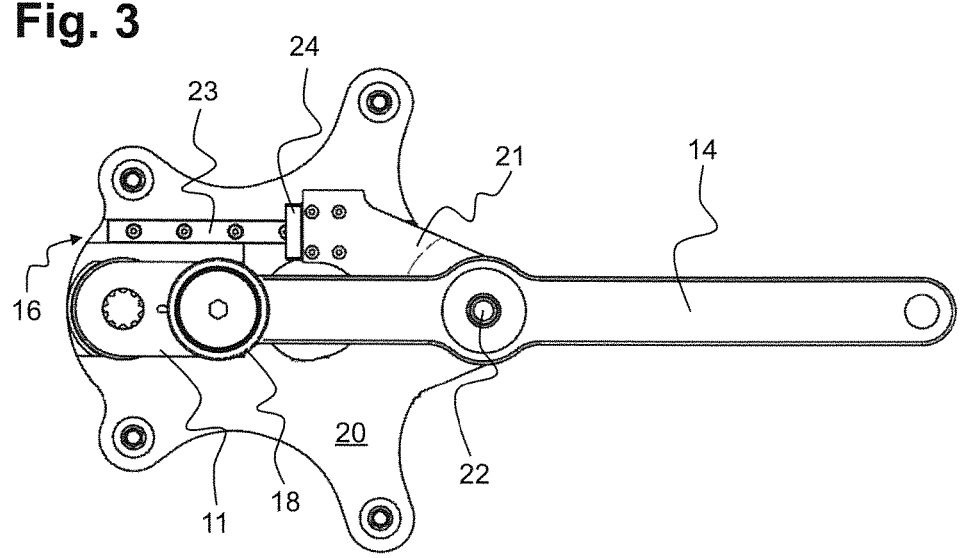
FIG. 3: a side view of a linear guide of the transmission according to a first embodiment.

FIG. 3 shows a first embodiment of a suitable linear guide 16 with a single guide rail 23 and a single carriage 24 arranged thereon. The guide rail 23 is profiled and the carriage 24 partly engages behind it, so that a detaching of the carriage 24 outward from the plane of the drawing is effectively prevented. The carriage 24 has one degree of freedom relative to the guide rail 23.

The guide rail 23 is placed on a mounting plate 20 and permanently joined to it.

On the carriage 24 at its end facing away from the guide rail 23 there is formed a carriage arm 21, which runs up to the third rotary bearing 22. The carriage arm 21 is oriented at a slant to the crank arm 14, in dependence on the crank 11. In the representation shown in FIG. 3, the crank 11 and the crank arm 14 are aligned in a horizontal axis and a maximum torque can be generated.

Figure 4:
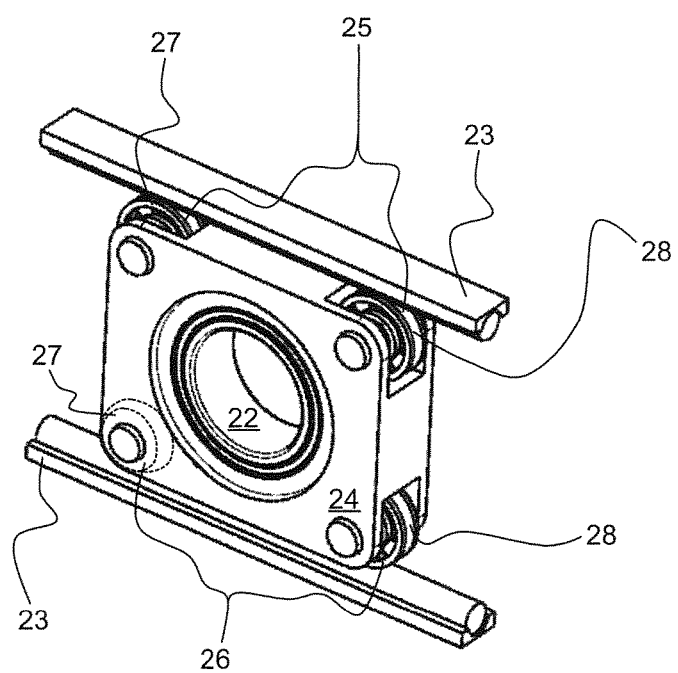
FIG. 4: a perspective view of a linear guide of the transmission according to a second embodiment.

FIG. 4 shows an alternative embodiment in which a carriage 24 is held between two parallel guide rails 23 and guided in their axial direction. The carriage 24 has a first roller pair 25 at its one end, facing the guide rail 23, and a second roller pair 26 at the opposite side, likewise close to the other guide rail 23. The two roller pairs 25, 26 each have a first roller 27 and a second roller 28.

The guide rails 23 are fashioned with a concave cross section at their end facing each other, against which the rollers 27 and 28 run, having a concave shape in their circumferential wall. In the same way, the guide rails 23 could have a concave cross section and the rollers 27, 28 could be fashioned with a convex cross section.

In the carriage 24, located centrally, one notices the third rotary bearing 22, by which the carriage 24 is connected to the crank arm 14 in rotational manner.

The two rollers 27, 28 of a roller pair 25, 26 arranged one behind the other effectively prevent a tilting of the carriage 24 about the third rotary bearing 22. The carriage 24 per FIG. 4 also has only one degree of freedom.

Figure 5:
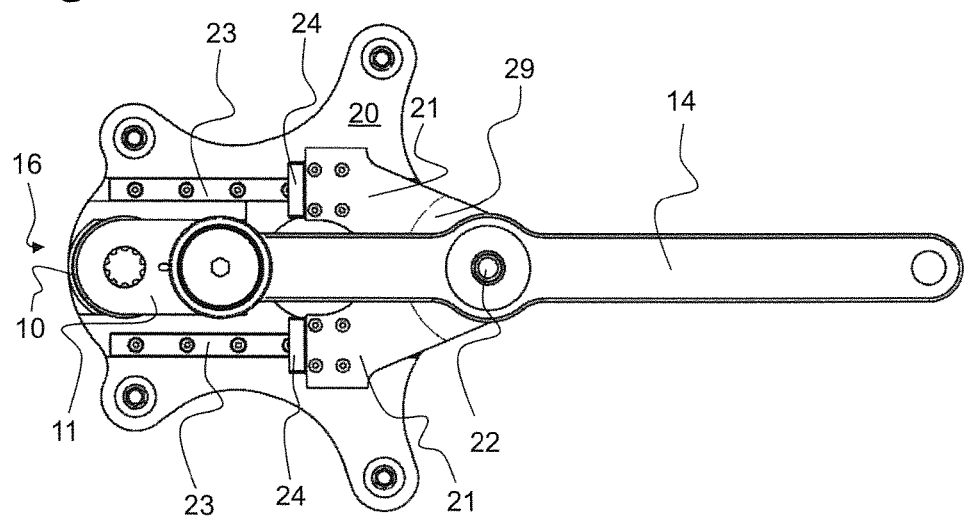
FIG. 5: a side view of a linear guide of the transmission according to a third embodiment.

FIG. 5 shows a further embodiment which is basically similar to the embodiment of FIG. 3. In departure from this, however, there are two parallel guide rails 23 secured to the mounting plate 20 and on each guide rail 23 there is located one carriage 24. At one end of the guide rails 23, the first rotary bearing 10 is located between them.

The two carriages 24 both have a carriage arm 21 running at a slant in the direction of the crank arm 14, and the two carriage arms 21 are joined to a tie bar 29. In the region of the tie bar 29 the third rotary bearing 22 is arranged. Each carriage 24 is movable with one degree of freedom relative to the corresponding guide rail 23.

Figure 6:
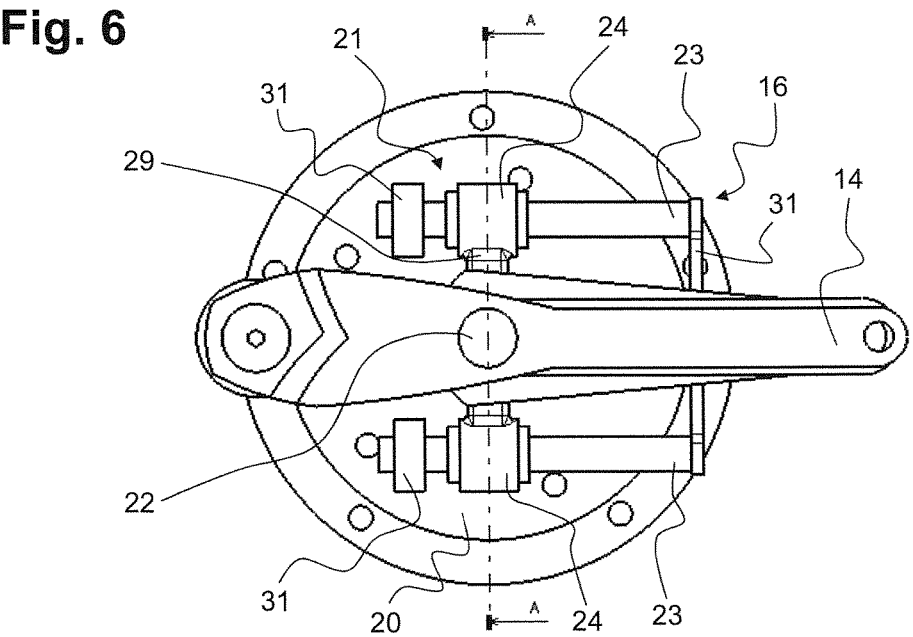
FIG. 6: a side view of a linear guide of the transmission according to a fourth embodiment.

FIGS. 6 and 7 show another embodiment, in which two cylindrical guide rails 23 are provided onto each of which a carriage 24 has been shoved. The guide rails 23 are spaced apart and fixed to the mounting plate 20 by means of brackets 31 and entirely enclosed in the circumferential direction by the carriage 24 which is guided thereon. Thus, each carriage 24 has two degrees of freedom for itself. However, the tie bar 29 joins the two carriages 24 and thereby prevents a rotation of an individual carriage 24 about the respective guide rail 23. The third rotary bearing 22 is also arranged here between the tie bar 29 and the crank arm 14.

LIST OF REFERENCE SYMBOLS

1 Main shaft
2 Housing
3 Main shaft bearing
4 Sun wheel
5 Control housing
6 First section of control housing
7 Second section of control housing
8 Planet gear
9 Force transmission means
10 First rotary bearing
11 Crank
12 First end of crank
13 Second end of crank
14 Crank arm
15 Movable coupling means
16 Linear guide
17 Wall segment
17a Inner side of wall segment
17b Outer side of wall segment
18 Second rotary bearing
19 Toothed ring
20 Mounting plate
21 Carriage arm
22 Third rotary bearing
23 Guide rail
24 Carriage
25 First roller pair
26 Second roller pair
27 First roller
28 Second roller
29 Tie bar
30 Pedal
31 Bracket
x Center axis

What is claimed is:

1. A transmission for a system, in which a directed force is introduced eccentrically to a main shaft of the transmission, comprising
the main shaft, which is mounted pivotably with respect to a stationary housing by a main shaft bearing, wherein a sun wheel firmly connected to the housing is arranged concentrically about the main shaft, and
at least one control housing rotating about the housing, whose first section engages with the main shaft in a rotationally fixed manner and on whose second section there is rotationally mounted a planet gear by a first rotary bearing, which meshes with the sun wheel, while on the control housing there is fastened a force transmission means and a crank rigidly engages the planet gear by its first end, while a second end of the crank is pivotally hinged to a crank arm and the crank arm is braced by a movable coupling means relative to the control housing, wherein the movable coupling means is a linear guide, which takes up the tilting moments transmitted by the crank arm.

2. The transmission according to claim 1, wherein the control housing has a wall segment whose inner side faces the sun wheel and the planet gear and whose outer side faces the crank.

3. The transmission according to claim 1, wherein the crank arm is mounted on the crank by a second rotary bearing and lies against the crank at one end.

4. The transmission according to claim 2, wherein the linear guide is arranged on the outer side of the wall segment.

5. The transmission according to claim 1, wherein the force transmission means is at least one toothed ring.

6. The transmission according to claim 1, wherein the linear guide comprises at least one guide rail with a carriage guided thereon.

7. The transmission according to claim 6, wherein the at least one guide rail and/or the carriage at least partly overlap the toothed ring in its axial direction or are arranged behind the toothed ring in the direction of the sun wheel.

8. The transmission according to claim 6, wherein the at least one guide rail is arranged such that the carriage travels twice across a center axis (x) of the main shaft during one revolution of the crank arm.

9. The transmission according to claim 6, wherein the carriage is movable on the guide rail with one degree of freedom.

10. The transmission according to claim 6, wherein two guide rails are provided, while the carriage is movable on the two guide rails with one degree of freedom each.

11. The transmission according to claim 10, wherein the carriage is arranged between the guide rails and is braced against them by two roller pairs each, the roller pairs each having two rollers whose cross section profile is designed complementary to the cross section profile of the respective guide rail.

12. The transmission according to claim 9, wherein a third rotary bearing engages the carriage and the crank arm.

13. The transmission according to claim 6, wherein two guide rails and two carriages are provided.

14. The transmission according to claim 13, wherein each carriage is movable on the respective guide rail with one degree of freedom.

15. The transmission according to claim 13, wherein each carriage is movable on the respective guide rail with two degrees of freedom.

16. The transmission according to claim 13, wherein the carriages are joined together by a tie bar and a third rotary bearing is arranged between the tie bar and the crank arm.

17. The transmission according to claim 6, wherein the carriage(s) are designed as a circulating ball element of a linear guide or a sliding bearing element.

18. The transmission according claim 1, wherein two control housings engage the main shaft and are arranged with an offset of 180° in the circumferential direction.

\* \* \* \* \*